Feb. 7, 1939.  T. P. CHASE  2,146,009
AUTOMOTIVE BRAKE
Filed April 8, 1936
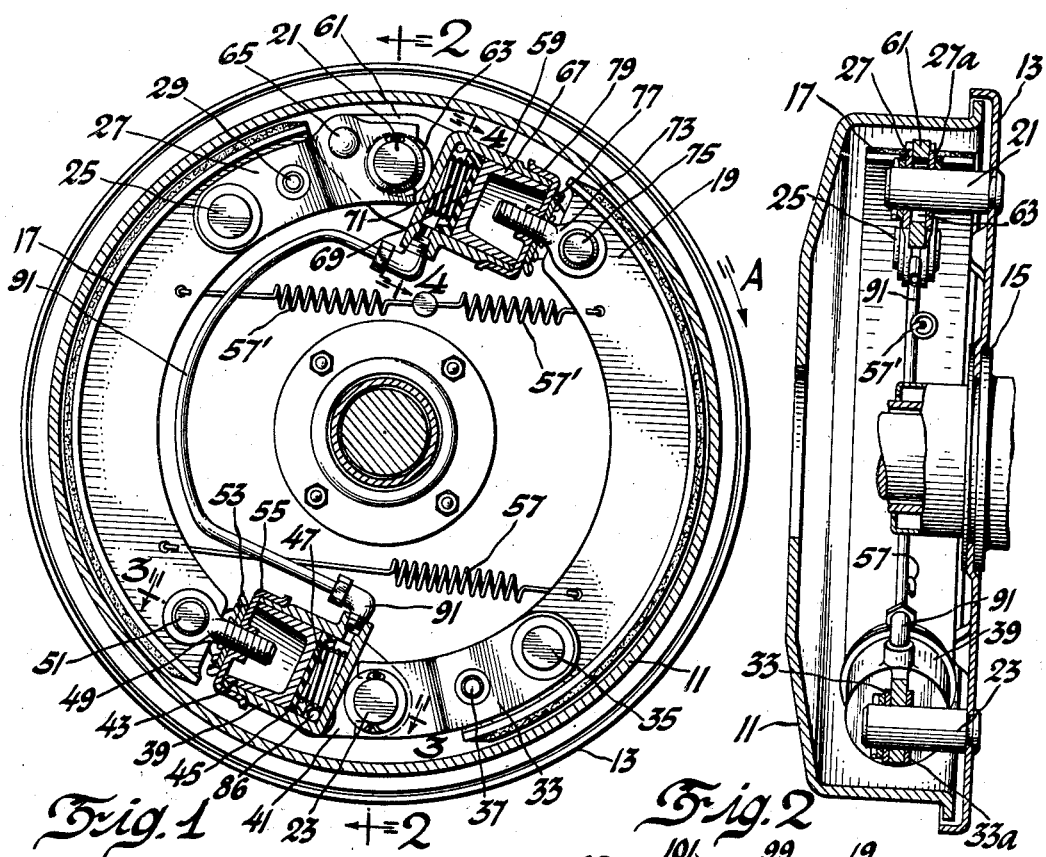
Fig. 1
Fig. 2
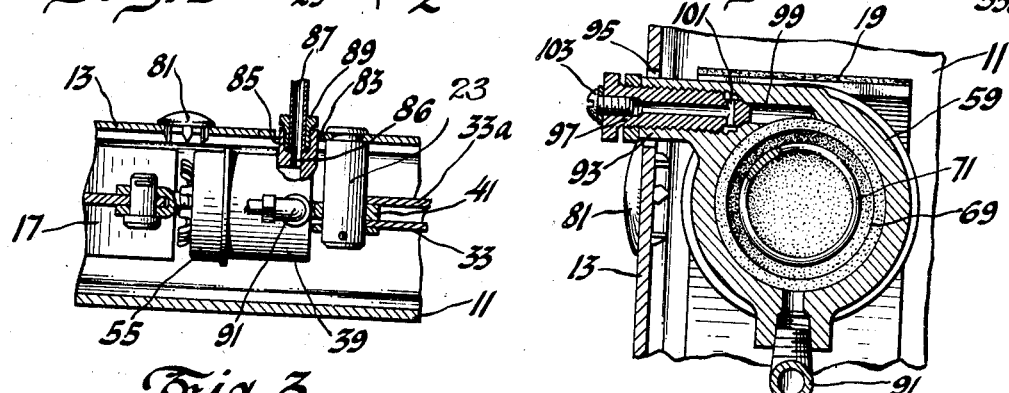
Fig. 3
Fig. 4
Inventor
Theron P. Chase
By Blackmore, Spencer & Flint
Attorneys Patented Feb. 7, 1939

2,146,009

UNITED STATES PATENT OFFICE 2,146,009

AUTOMOTIVE BRAKE

Theron P. Chase, Detroit, Mich., assignor to General Motors Corporation, Detroit, Mich., a corporation of Delaware Application April 8, 1936, Serial No. 73,273

3 Claims. (Cl. 188—152)

The invention relates to brakes and has been designed for use on vehicles.

An object of the invention is to provide a brake adapted to be applied to a wheel carried drum in which brake are two shoes both arranged to be very effective for checking forward travel, one only to be highly effective for checking rearward travel.

A further object is to provide a brake wherein the above object involves structure of high efficiency yet involving low cost.

A still further object relates to the use of hydraulic applying means comprising a plurality of similar wheel cylinders, one between each pair of adjacent ends of the shoes, the two cylinders having but a single supply conduit and a single air bleed.

Other objects and advantages will appear in the following description.

In the drawing accompanying this description:

Fig. 1 is a section through a brake drum showing the above assembly in elevation.

Fig. 2 is a section on line 2—2 of Fig. 1.

Fig. 3 is a section on line 3—3 of Fig. 1.

Fig. 4 is a section on line 4—4 of Fig. 1.

Referring by reference characters to the drawing, numeral 11 is used to designate the drum which is carried by the vehicle wheel. The drum is closed by a cover plate 13 secured to the axle housing at 15. Within the drum enclosure are shoes 17 and 19 movable to engage the inner surface of the drum and check its rotation. Secured to the cover are anchor pins 21 and 23 located diametrically opposite each other.

An articulating link device, comprising links 27 and 27a, is pivoted to shoe 17 at 25. The ends of the links 27 and 27a are recessed to engage anchor pin 21. A limited free rotation of the links about pivot 25 is provided as at 29. Shoe 19 is adapted to anchor an anchor pin 23 by links 33, 33a pivoted at 35 on shoe 19, a limited motion being provided at 37.

Pivotally supported on anchor pin 23 is the arm 41 of a wheel cylinder 39 of a hydraulic brake system. Within cylinder 39 is a piston 43 with a sealing cup 45. A spring 47 is located between the cup and the end of the cylinder. A screw 49 is pivoted to shoe 17 at 51. An adjusting nut and cap 53, 55, the parts being integral or connected together, is threaded on the screw and engages the end of the piston and is adapted also to engage the end of the cylinder when the shoe is released by springs 57, 57'.

A somewhat similar cylinder 59 is located between the opposite pair of shoe ends. It has an arm 61 with an opening 63 surrounding, with suitable clearance, anchor pin 21. The arm 61 is pivoted at 65 to links 27, 27a. Within cylinder 59 is a piston 67, a seal 69, and a spring 71. A screw 73 is pivoted at 75 to shoe 19. It is in threaded engagement with an adjusting nut 77 and a cup 79 embraces the screw beneath the nut and seats on the end of the piston and cylinder under the influence of retracting spring 57'. Adjustment of shoe clearance is made by rotating the nuts 53 and 77, access to which is had by removing closures 81 in the cover plate 13. Adjacent cylinder 39 the backing plate 13 has an opening 83. Cylinder 39 has a projection 85 apertured as at 86 entering this opening and a fluid conduit 87 from a source of fluid pressure is connected to the projection by suitable fastening means 89. Apertured projection 85 is located at the lowest part of cylinder 39 as shown by Fig. 1. From the top of cylinder 39 a conduit 91 connects with the bottom of cylinder 59. From the top of cylinder 59 a projection 93 extends through a suitably enlarged opening 95 in cover plate 13. Into 93 is threaded a tapered and apertured plug 97 adapted when screwed down to close the passage 99 through projection 93. When the screw 97 is turned to release the seated end, passage 99 is in communication with an axial passage 101 to permit the bleeding of air from both cylinders. The passages may be kept free from foreign matter by a threaded member 103. To apply the brakes, fluid pressure is applied from a suitable and conventional master cylinder (not shown) through conduits such as 87 to the cylinders 39 and 59. Since cylinder 39 is pivotally held by anchor pin 23, the effect of the moving fluid column is to move piston 43 and push shoe 17 against the drum, the shoe linkage 27 affording an anchorage at 21. This action is supplemented by the effect of the drum rotation when the vehicle is traveling in a forward direction (see arrow A). These forces hold point 65 fixed from being moved to the left by the fluid pressure within cylinder 59. That fluid pressure therefore moves piston 67 and applies shoe 19 to the drum, shoe 19 anchoring on pin 23. Here, again, when the drum is rotating in the direction of arrow A, the drum rotation supplements the applied pressure. Both shoes are highly effective for checking forward travel. For checking rearward travel, the tendency of the applied pressure to move piston 43 of cylinder 39 is offset by the effect of drum rotation on shoe 17. The cap 55 remains in contact with the cylinder which is anchored on pin 23. This effect of drum rotation to apply shoe 17 is supplemented by the pressure applied in cylinder 59. The cylinder may move bodily toward the left (Fig. 1) owing to the enlarged opening 63. This force is applied to the shoe 17 through the connection 65. Shoe 17 is therefore effective as a self-actuating shoe to check reverse travel. The outward movement of piston 67 in cylinder 59 is resisted by the effect of drum rotation on shoe 19 so that shoe 19 is effective only as a non-self-actuating shoe in checking rearward travel.

I claim:

1. In a brake for vehicles, two shoes, applying means between each pair of adjacent ends of said shoes, anchor pins located between each pair of adjacent ends of said shoes, one shoe anchoring on one pin, the other shoe on the other pin under the influence of forces applied by said applying means and supplemented by the influence upon the shoes of that drum rotation corresponding to forward vehicle travel, the other ends of said shoes being unanchored upon said anchored pins, each said applying means comprising a hydraulic cylinder, a piston movable therein, the cylinder of one of said applying means being anchored on one anchor pin and its piston connected to the adjacent unanchored shoe end and the cylinder and piston of the opposite applying means being connected to the adjacent shoe ends, said last-named applying means being movable relatively to the adjacent anchor pin.

2. In a brake, a drum, two shoes, two anchor pins, one between each pair of adjacent shoe ends, two applying means, each comprising parts having relative axial movement, one such applying means being located between each pair of adjacent shoe ends, one of said applying means having its parts connected to the adjacent shoe ends, one of said shoe ends adapted to engage a first one of said anchor pins, the parts of the other applying means engaged with one shoe and the adjacent anchor pin, the other adjacent shoe end anchoring on the adjacent pin.

3. In a brake, a drum, two shoes to engage the drums, an anchor between each pair of adjacent ends, applying means between each pair of adjacent ends, one only of each pair of adjacent shoe ends engaging the adjacent anchor in response to one direction of drum rotation, each said applying means including relatively movable parts, the parts of one of said applying means being connected to the end of one shoe and to the adjacent anchor and the parts of the other applying means being connected to the two adjacent shoe ends.

THERON P. CHASE.